US011140232B2

(12) United States Patent
Bratsman et al.

(10) Patent No.: US 11,140,232 B2
(45) Date of Patent: Oct. 5, 2021

(54) ANALYZING GEO-SPATIAL DATA IN LAYERS

(71) Applicant: Facebook, Inc., Menlo Park, CA (US)

(72) Inventors: Scott J. Bratsman, Fremont, CA (US); Aude Hofleitner, San Francisco, CA (US); Jacob Perkowski, Waltham, MA (US); Tsuwei Chen, Cupertino, CA (US)

(73) Assignee: Facebook, Inc., Menlo Park, CA (US)

( * ) Notice: Subject to any disclaimer, the term of this patent is extended or adjusted under 35 U.S.C. 154(b) by 247 days.

(21) Appl. No.: 15/633,615

(22) Filed: Jun. 26, 2017

(65) Prior Publication Data

US 2018/0375945 A1  Dec. 27, 2018

(51) Int. Cl.
| | | |
|---|---|---|
| *H04L 29/08* | (2006.01) | |
| *H04W 4/029* | (2018.01) | |
| *H04W 4/21* | (2018.01) | |
| *G06F 16/909* | (2019.01) | |
| *G06Q 50/12* | (2012.01) | |
| *G06Q 50/16* | (2012.01) | |
| *G06Q 50/26* | (2012.01) | |
| *G06Q 50/00* | (2012.01) | |

(52) U.S. Cl.
CPC ............ *H04L 67/22* (2013.01); *G06F 16/909* (2019.01); *H04L 67/02* (2013.01); *H04L 67/306* (2013.01); *H04W 4/029* (2018.02); *H04W 4/21* (2018.02); *G06Q 50/01* (2013.01); *G06Q 50/12* (2013.01); *G06Q 50/16* (2013.01); *G06Q 50/26* (2013.01)

(58) Field of Classification Search
CPC ....... H04L 67/22; H04L 67/306; H04L 67/00; H04L 67/02; H04W 4/029; H04W 4/21; G06Q 50/01; G06Q 50/12; G06Q 50/16; G06Q 50/26; G06F 16/00; G06F 16/909
USPC ........................................................ 709/217
See application file for complete search history.

(56) References Cited

U.S. PATENT DOCUMENTS

| | | | | |
|---|---|---|---|---|
| 8,135,800 | B1 * | 3/2012 | Walsh ................... | G06F 16/337 709/217 |
| 8,620,736 | B2 * | 12/2013 | Gross ..................... | G06Q 30/02 705/14.1 |
| 8,739,016 | B1 * | 5/2014 | Goldman .............. | G06F 16/951 715/200 |
| 8,837,360 | B1 * | 9/2014 | Mishra ................... | H04L 41/12 370/254 |
| 9,083,747 | B2 * | 7/2015 | Braginsky .............. | H04L 67/18 |
| 10,223,397 | B1 * | 3/2019 | Sehn ....................... | H04L 67/22 |
| 2002/0115453 | A1 * | 8/2002 | Poulin .................. | H04W 4/029 455/456.4 |

(Continued)

*Primary Examiner* — Michael Won
(74) *Attorney, Agent, or Firm* — Baker Botts L.L.P.

(57) ABSTRACT

In one embodiment, a method includes accessing a location history of a user of a social-networking system. The social-networking system includes a social graph that includes multiple nodes and edges connecting the nodes. At least node corresponds to the user. The method includes accessing a data set from a third-party source independent of the social-networking system. The data set references one or more locations. The method includes comparing the location history of the user with the locations referenced by the data set to determine an overlap between the location history and the data set and determining based on the comparison one or more labels to assign to the user or to one or more locations where the location history and the data set overlap.

21 Claims, 7 Drawing Sheets

(56) References Cited

U.S. PATENT DOCUMENTS

| | | | |
|---|---|---|---|
| 2005/0038876 A1* | 2/2005 | Chaudhuri | H04L 67/24 709/219 |
| 2007/0150444 A1* | 6/2007 | Chesnais | H04L 67/24 |
| 2008/0102856 A1* | 5/2008 | Fortescue | H04W 4/029 455/456.1 |
| 2008/0255977 A1* | 10/2008 | Altberg | G06Q 40/00 705/35 |
| 2009/0006375 A1* | 1/2009 | Lax | G06Q 30/02 |
| 2010/0094729 A1* | 4/2010 | Gray | G06Q 30/0601 705/26.1 |
| 2010/0332330 A1* | 12/2010 | Goel | G06Q 50/01 705/14.66 |
| 2011/0213762 A1* | 9/2011 | Sherrets | G06Q 30/02 707/706 |
| 2011/0238755 A1* | 9/2011 | Khan | H04W 4/023 709/204 |
| 2012/0030282 A1* | 2/2012 | Brody | G06Q 50/01 709/203 |
| 2012/0078726 A1* | 3/2012 | Black | G06Q 50/01 705/14.66 |
| 2012/0233238 A1* | 9/2012 | Braginsky | G06Q 30/0261 709/203 |
| 2013/0006816 A1* | 1/2013 | Nuzzi | G06Q 30/0261 705/27.1 |
| 2013/0054698 A1* | 2/2013 | Lee | G06Q 30/0267 709/204 |
| 2013/0073473 A1* | 3/2013 | Heath | G06Q 30/06 705/319 |
| 2013/0185355 A1* | 7/2013 | Tseng | H04W 4/023 709/204 |
| 2013/0254289 A1* | 9/2013 | Cutri | H04L 51/32 709/204 |
| 2013/0254309 A1* | 9/2013 | Jackson | H04L 51/20 709/206 |
| 2014/0122136 A1* | 5/2014 | Jayanthi | H04M 1/72457 705/5 |
| 2014/0189530 A1* | 7/2014 | Anand | G06Q 30/06 715/753 |
| 2014/0280727 A1* | 9/2014 | Richards | H04L 67/20 709/217 |
| 2015/0046566 A1* | 2/2015 | Vaynblat | G06F 16/955 709/217 |
| 2015/0242424 A1* | 8/2015 | Godsey | G06Q 50/01 707/689 |
| 2015/0242911 A1* | 8/2015 | Zises | G06Q 30/0605 705/14.64 |
| 2015/0249913 A1* | 9/2015 | Hua | H04W 12/003 455/41.2 |
| 2015/0256985 A1* | 9/2015 | Kornafeld | H04W 4/12 455/466 |
| 2015/0304437 A1* | 10/2015 | Vaccari | H04L 51/32 709/204 |
| 2015/0339689 A1* | 11/2015 | Chen | G06Q 30/0205 705/7.34 |
| 2016/0127485 A1* | 5/2016 | Tseng | G06Q 30/0267 709/205 |
| 2016/0164958 A1* | 6/2016 | Sharan | G06Q 30/0269 726/7 |
| 2017/0006430 A1* | 1/2017 | Chao | H04W 4/029 |
| 2017/0161846 A1* | 6/2017 | Todasco | G06Q 50/01 |
| 2017/0164145 A1* | 6/2017 | Lipman | H04W 4/021 |
| 2018/0052850 A1* | 2/2018 | Chatterjee | G06F 16/24578 |
| 2018/0101869 A1* | 4/2018 | Zacharatos | G06Q 10/02 |

* cited by examiner

ANALYZING GEO-SPATIAL DATA IN LAYERS

TECHNICAL FIELD

This disclosure generally relates to analyzing data sets in a social-networking environment.

BACKGROUND

A social-networking system, which may include a social-networking website, may enable its users (such as individuals or organizations) to interact with it and each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data in the social-networking system. The social-networking system may generate a personalized set of content objects to display to a user, such as a newsfeed of aggregated stories of other users connected to the user. Subject to privacy settings by users, the social-networking system may also collect and store data regarding the locations and movements of the users based on Global Positioning System (GPS) or other location information from mobile or other computing devices of the users. This data may be used to provide the users with targeted services and content based on their locations or movements.

SUMMARY OF PARTICULAR EMBODIMENTS

In particular embodiments, a social-networking or other system may increase understanding of real-world location context by overlaying various data sets on geolocation data of users. The data sets overlaid on geolocation data may be publicly available data, licensed data, data from business partners, internal data (such as social-networking data in the social-networking system), or any other suitable data. In particular embodiments, with the increased understanding of real-world location context, inferences may be drawn about the activities and interests of a user or about the purpose, relevance, significance, status, or use of a location. Based on such inferences, a description or other label may be assigned to the user or location in the social-networking system, which may facilitate better delivery by the social-networking system of more relevant or more useful content to the user or other users.

The embodiments disclosed above and elsewhere herein are only examples, and the scope of this disclosure is not necessarily limited to them. Particular embodiments may include all, some, or none of the components, elements, features, functions, operations, or steps of the embodiments disclosed herein.

DESCRIPTION OF EXAMPLE EMBODIMENTS

Figure 1:
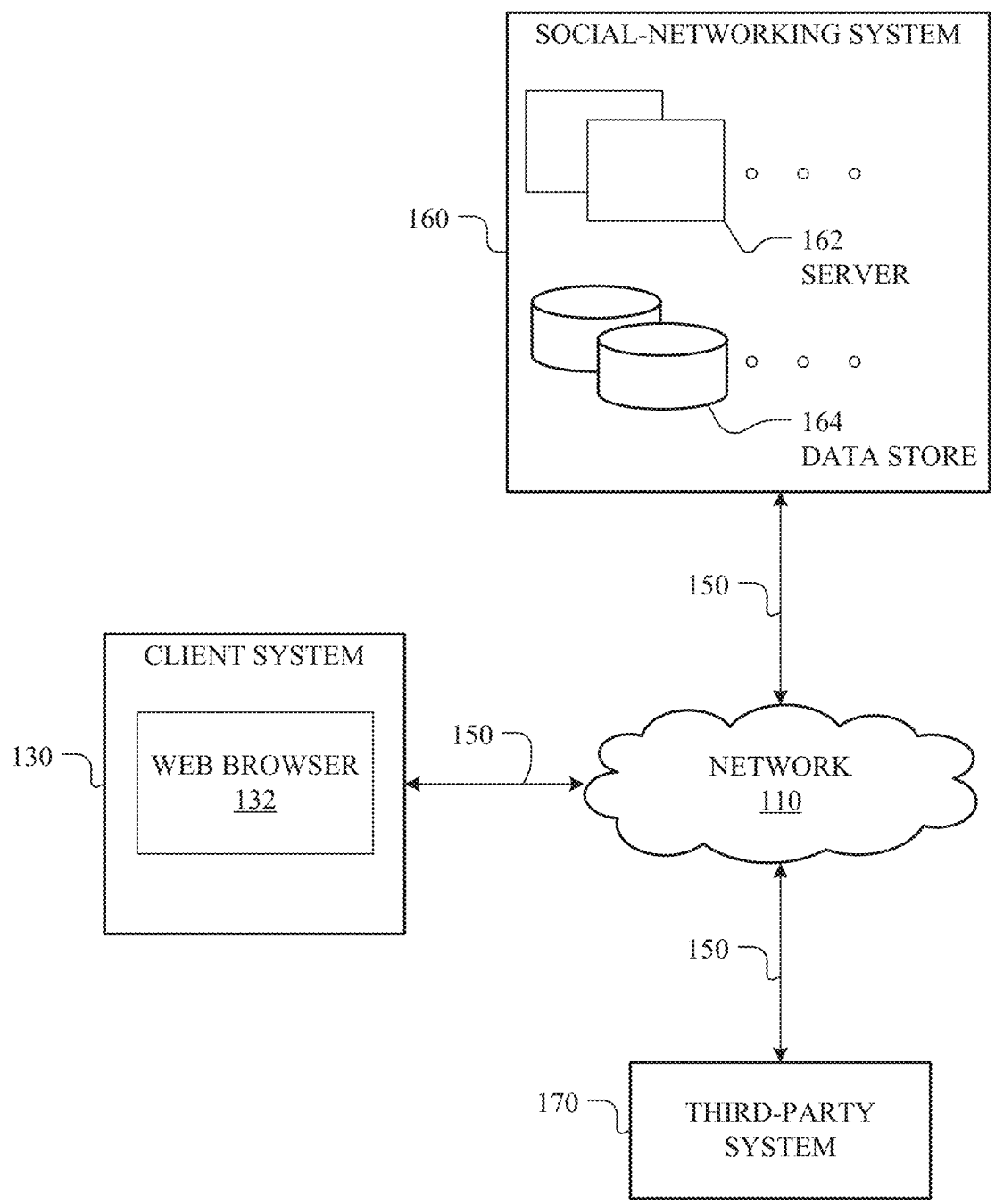
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded-logic components or a combination of two or more such components and capable of carrying out appropriate functionalities implemented or supported by client system 130. As an example and not by way of limitation, a client system 130 may include a mobile or stationary computer system, such as a desktop computer, notebook or laptop computer, netbook, tablet computer, e-book reader, Global Positioning System (GPS) device, camera, personal digital assistant (PDA), handheld electronic device, cellular or other mobile telephone, smartphone, augmented or virtual reality device, other suitable electronic device, or any suitable combination thereof. A mobile computing device may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks. Although this disclosure describes particular client systems 130 with particular functionality, this disclosure contemplates any suitable client systems 130 with any suitable functionality. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a web page based on the HTML files from the server for presentation to the user. This disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g. a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded-logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g. relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g. third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
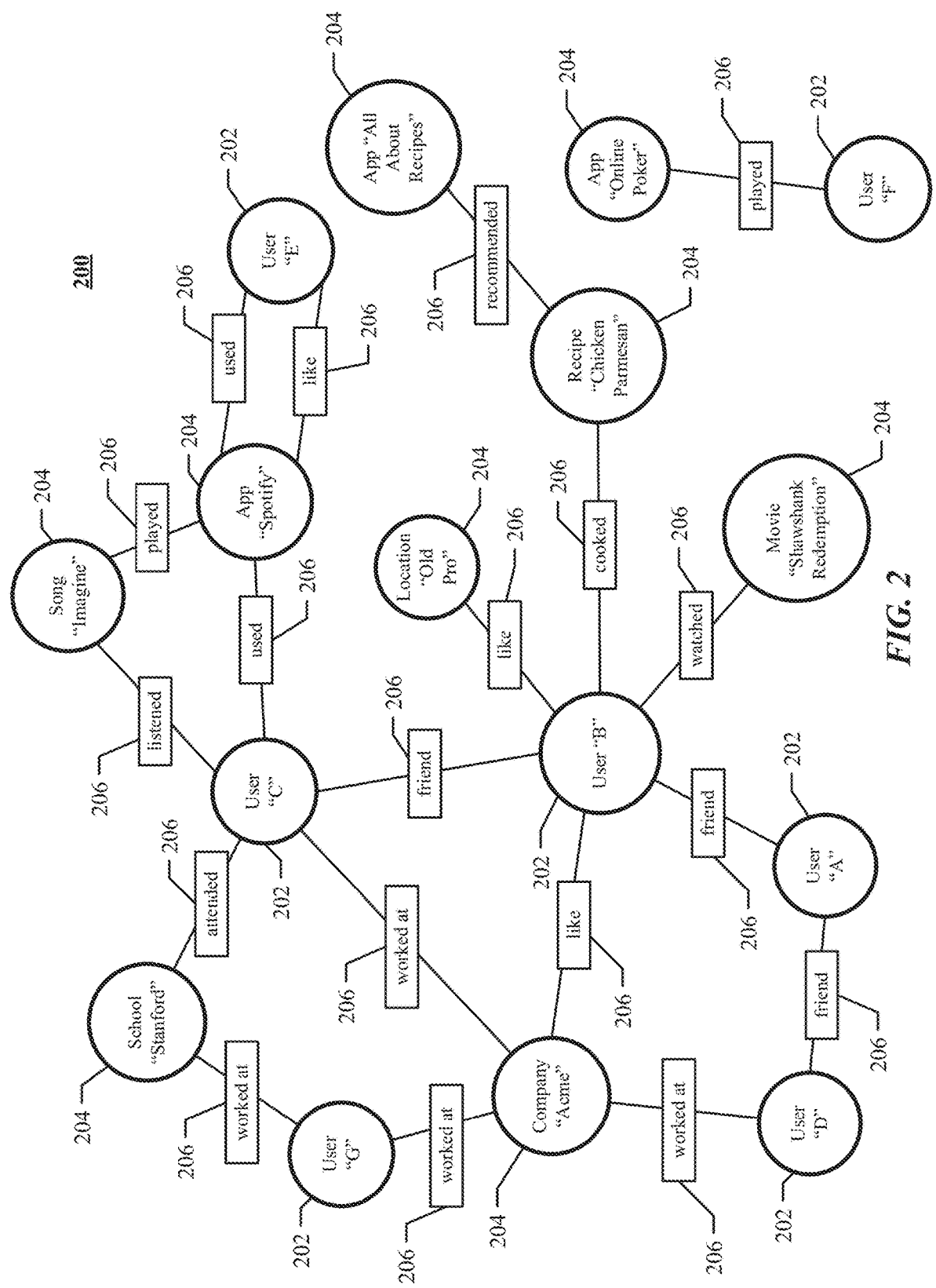
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200. Social-graph analysis may view social relationships, in terms of network theory, as nodes and edges. Nodes may represent individual actors within the networks, and edges may represent the relationships between them. The resulting graph-based structures may be complex. There may be many types of nodes and many types of edges for connecting nodes, and a social graph may be a map of the relevant edges between the relevant nodes.

In particular embodiments, a user node 202 may correspond to a user of social-networking system 160. As an example and not by way of limitation, a user may be an individual (human user), an entity (e.g. an enterprise, business, or third-party application), or a group (e.g. of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more web pages.

In particular embodiments, a concept node 204 may correspond to a concept. As an example and not by way of limitation, a concept may be a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented- or virtual-reality environment; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g. an image of the cover page of a book); a location (e.g. a physical address or other geographic location); a website (which may be associated with a URL); contact information (e.g. a phone number or an e-mail address); other suitable concept information; or any suitable combination of such information. In particular embodiments, a concept node 204 may be associated with one or more data objects corresponding to information associated with concept node 204. In particular embodiments, a concept node 204 may correspond to one or more web pages.

In particular embodiments, a node in social graph 200 may represent or be represented by a web page (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external web page may be the particular external web page and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party web page or resource hosted by a third-party system 170. The third-party web page or resource may include, among other elements, content, a selectable or other icon, or other inter-actable object (which may be implemented, for example, in JavaScript, AJAX, or PHP codes) representing an action or activity. As an example and not by way of limitation, a third-party web page may include a selectable icon such as "like," "check-in," "eat," "recommend," or another suitable action or activity. A user viewing the third-party web page may perform an action by selecting one of the icons (e.g. "check-in"), causing a client system 130 to send to social-networking system 160 a message indicating the user's action. In response to the message, social-networking system 160 may create an edge (e.g. a check-in-type edge) between a user node 202 corresponding to the user and a concept node 204 corresponding to the third-party web page or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more web pages, in one or more e-mails, or in connection with search results requested by a user. In addition or as an alternative, an advertisement may be one or more sponsored stories (e.g. a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. The social action may be promoted within or on social-networking system 160. In addition or as an alternative, the social action may be promoted outside or off of social-networking system 160, where appropriate. In particular embodiments, a page may be an on-line presence (such as a web page or website within or outside of social-networking system 160) of a business, organization, or brand facilitating its sharing of stories and connecting with people. A page may be customized, for example, by adding applications, posting stories, or hosting events.

A sponsored story may be generated from stories in users' news feeds and promoted to specific areas within displays of users' web browsers when viewing a web page associated with social-networking system 160. Sponsored stories are more likely to be viewed by users, at least in part because sponsored stories generally involve interactions or suggestions by the users' friends, fan pages, or other connections. In connection with sponsored stories, particular embodiments may utilize one or more systems, components, elements, functions, methods, operations, or steps disclosed in U.S. patent application Ser. No. 13/327,557, entitled "Sponsored Stories Unit Creation from Organic Activity Stream" and filed 15 Dec. 2011, U.S. Patent Application Publication No. 2012/0203831, entitled "Sponsored Stories Unit Creation from Organic Activity Stream" and filed 3 Feb. 2012 as U.S. patent application Ser. No. 13/020,745, or U.S. Patent Application Publication No. 2012/0233009, entitled "Endorsement Subscriptions for Sponsored Stories" and filed 9 Mar. 2011 as U.S. patent application Ser. No. 13/044,506, which are all incorporated herein by reference as an example and not by way of limitation. In particular embodiments, sponsored stories may utilize computer-vision algorithms to detect products in uploaded images or photos lacking an explicit connection to an advertiser as disclosed in U.S. patent application Ser. No. 13/212,356, entitled "Computer-Vision Content Detection for Sponsored Stories" and filed 18 Aug. 2011, which is incorporated herein by reference as an example and not by way of limitation.

As described above, an advertisement may be text (which may be HTML-linked), one or more images (which may be HTML-linked), one or more videos, audio, one or more ADOBE FLASH files, a suitable combination of these, or any other suitable advertisement in any suitable digital format. In particular embodiments, an advertisement may be requested for display within third-party web pages, social-networking-system web pages, or other pages. An advertisement may be displayed in a dedicated portion of a page, such as in a banner area at the top of the page, in a column at the side of the page, in a GUI of the page, in a pop-up window, over the top of content of the page, or elsewhere with respect to the page. In addition or as an alternative, an advertisement may be displayed within an application or within a game. An advertisement may be displayed within dedicated pages, requiring the user to interact with or watch the advertisement before the user may access a page, utilize an application, or play a game. The user may, for example view the advertisement through a web browser.

A user may interact with an advertisement in any suitable manner. The user may click or otherwise select the advertisement, and the advertisement may direct the user (or a browser or other application being used by the user) to a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). In particular embodiments, an advertisement may include one or more games, which a user or other application may play in connection with the advertisement. An advertisement may include functionality for responding to a poll or question in the advertisement.

An advertisement may include social-networking-system functionality that a user may interact with. For example, an advertisement may enable a user to "like" or otherwise endorse the advertisement by selecting an icon or link associated with endorsement. Similarly, a user may share the advertisement with another user (e.g. through social-networking system 160) or RSVP (e.g. through social-networking system 160) to an event associated with the advertisement. In addition or as an alternative, an advertisement may include social-networking-system content directed to the user. For example, an advertisement may display information about a friend of the user within social-networking system 160 who has taken an action associated with the subject matter of the advertisement.

Social-networking-system functionality or content may be associated with an advertisement in any suitable manner. For example, an advertising system (which may include hardware, software, or both for receiving bids for advertisements and selecting advertisements in response) may retrieve social-networking functionality or content from social-networking system 160 and incorporate the retrieved social-networking functionality or content into the advertisement before serving the advertisement to a user. Examples of selecting and providing social-networking-system functionality or content with an advertisement are disclosed in U.S. Patent Application Publication No. 2012/0084160, entitled "Providing Social Endorsements with Online Advertising" and filed 5 Oct. 2010 as U.S. patent application Ser. No. 12/898,662, and in U.S. Patent Application Publication No. 2012/0232998, entitled "Selecting Social Endorsement Information for an Advertisement for Display to a Viewing User" and filed 8 Mar. 2011 as U.S. patent application Ser. No. 13/043,424, which are both incorporated herein by reference as examples only and not by way of limitation. Interacting with an advertisement that is associated with social-networking-system functionality or content may cause information about the interaction to be displayed in a profile page of the user in social-networking-system 160.

Particular embodiments may facilitate the delivery of advertisements to users that are more likely to find the advertisements more relevant or useful. For example, an advertiser may realize higher conversion rates (and therefore higher return on investment (ROI) from advertising) by identifying and targeting users that are more likely to find its advertisements more relevant or useful. The advertiser may use user-profile information in social-networking system 160 to identify those users. In addition or as an alternative, social-networking system 160 may use user-profile information in social-networking system 160 to identify those users for the advertiser. As examples and not by way of limitation, particular embodiments may target users with the following: invitations or suggestions of events; suggestions regarding coupons, deals, or wish-list items; suggestions regarding friends' life events; suggestions regarding groups; advertisements; or social advertisements. Such targeting may occur, where appropriate, on or within social-networking system 160, off or outside of social-networking system 160, or on mobile computing devices of users. When on or within social-networking system 160, such targeting may be directed to users' news feeds, search results, e-mail or other in-boxes, or notifications channels or may appear in particular area of web pages of social-networking system 160, such as a right-hand side of a web page in a concierge or grouper area (which may group along a right-hand rail advertisements associated with the same concept, node, or object) or a network-ego area (which may be based on what a user is viewing on the web page and a current news feed of the user). When off or outside of social-networking system 160, such targeting may be provided through a third-party website, e.g., involving an ad exchange or a social plug-in. When on a mobile computing device of a user, such targeting may be provided through push notifications to the mobile computing device.

Targeting criteria used to identify and target users may include explicit, stated user interests on social-networking system 160 or explicit connections of a user to a node, object, entity, brand, or page on social-networking system 160. In addition or as an alternative, such targeting criteria may include implicit or inferred user interests or connections (which may include analyzing a user's history, demographic, social or other activities, friends' social or other activities, subscriptions, or any of the preceding of other users similar to the user (e.g. based on shared interests, connections, or events)). Particular embodiments may utilize platform targeting, which may involve platform and "like" impression data; contextual signals (e.g. "Who is viewing now or has viewed recently the page for COCA-COLA?"); light-weight connections (e.g. "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; prediction of future geographic location; views of profile or pages; status updates or other user posts (analysis of which may involve natural-language processing or keyword extraction); events information; or collaborative filtering. Identifying and targeting users may also include privacy settings (such as user opt-outs), data hashing, or data anonymization, as appropriate.

To target users with advertisements, particular embodiments may utilize one or more systems, components, elements, functions, methods, operations, or steps disclosed in the following, which are all incorporated herein by reference as examples and not by way of limitation: U.S. Patent Application Publication No. 2009/0119167, entitled "Social Advertisements and Other Informational Messages on a Social Networking Website and Advertising Model for Same" and filed 18 Aug. 2008 as U.S. patent application Ser. No. 12/193,702; U.S. Patent Application Publication No. 2009/0070219, entitled "Targeting Advertisements in a Social Network" and filed 20 Aug. 2008 as U.S. patent application Ser. No. 12/195,321; U.S. Patent Application Publication No. 2012/0158501, entitled "Targeting Social Advertising to Friends of Users Who Have Interacted With an Object Associated with the Advertising" and filed 15 Dec. 2010 as U.S. patent application Ser. No. 12/968,786; or U.S. Patent Application Publication No. 2012/0166532, entitled "Contextually Relevant Affinity Prediction in a Social-Networking System" and filed 23 Dec. 2010 as U.S. patent application Ser. No. 12/978,265.

An advertisement may be presented or otherwise delivered using plug-ins for web browsers or other applications, iframe elements, news feeds, tickers, notifications (which may include, for example, e-mail, Short Message Service (SMS) messages, or notifications), or other means. An advertisement may be presented or otherwise delivered to a user on a mobile or other computing device of the user. In connection with delivering advertisements, particular embodiments may utilize one or more systems, components, elements, functions, methods, operations, or steps disclosed in the following, which are all incorporated herein by reference as examples and not by way of limitation: U.S. Patent Application Publication No. 2012/0159635, entitled "Comment Plug-In for Third-Party System" and filed 15 Dec. 2010 as U.S. patent application Ser. No. 12/969,368; U.S. Patent Application Publication No. 2012/0158753, entitled "Comment Ordering System" and filed 15 Dec. 2010 as U.S. patent application Ser. No. 12/969,408; U.S. Pat. No. 7,669,123, entitled "Dynamically Providing a News Feed About a User of a Social Network" and filed 11 Aug. 2006 as U.S. patent application Ser. No. 11/503,242; U.S. Pat. No. 8,402,094, entitled "Providing a Newsfeed Based on User Affinity for Entities and Monitored Actions in a Social Network Environment" and filed 11 Aug. 2006 as U.S. patent application Ser. No. 11/503,093; U.S. Patent Application Publication No. 2012/0072428, entitled "Action Clustering for News Feeds" and filed 16 Sep. 2010 as U.S. patent application Ser. No. 12/884,010; U.S. Patent Application Publication No. 2011/0004692, entitled "Gathering Information about Connections in a Social Networking Service" and filed 1 Jul. 2009 as U.S. patent application Ser. No. 12/496,606; U.S. Patent Application Publication No. 2008/0065701, entitled "Method and System for Tracking Changes to User Content in an Online Social Network" and filed 12 Sep. 2006 as U.S. patent application Ser. No. 11/531,154; U.S. Patent Application Publication No. 2008/0065604, entitled "Feeding Updates to Landing Pages of Users of an Online Social Network from External Sources" and filed 17 Jan. 2007 as U.S. patent application Ser. No. 11/624,088; U.S. Pat. No. 8,244,848, entitled "Integrated Social-Network Environment" and filed 19 Apr. 2010 as U.S. patent application Ser. No. 12/763,171; U.S. Patent Application Publication No. 2011/0083101, entitled "Sharing of Location-Based Content Item in Social-Networking Service" and filed 6 Oct. 2009 as U.S. patent application Ser. No. 12/574,614; U.S. Pat. No. 8,150,844, entitled "Location Ranking Using Social-Graph Information" and filed 18 Aug. 2010 as U.S. patent application Ser. No. 12/858,718; U.S. patent application Ser. No. 13/051,286, entitled "Sending Notifications to Users Based on Users' Notification Tolerance Levels" and filed 18 Mar. 2011; U.S. patent application Ser. No. 13/096,184, entitled "Managing Notifications Pushed to User Devices" and filed 28 Apr. 2011; U.S. patent application Ser. No. 13/276,248, entitled "Platform-Specific Notification Delivery Channel" and filed 18 Oct. 2011; or U.S. Patent Application Publication No. 2012/0197709, entitled "Mobile Advertisement with Social Component for Geo-Social Networking System" and filed 1 Feb. 2011 as U.S. patent application Ser. No. 13/019,061. Although this disclosure describes or illustrates particular advertisements being delivered in particular ways and in connection with particular content, this disclosure contemplates any suitable advertisements delivered in any suitable ways and in connection with any suitable content.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g. so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, e-mails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user frequently posts content related to "coffee" or variants thereof, social-networking system 160 may determine the user has a high coefficient with respect to the concept "coffee". Particular actions or types of actions may be assigned a higher weight or rating than other actions, which may affect the overall calculated coefficient. As an example and not by way of limitation, if a first user e-mails a second user, the weight or the rating for the action may be higher than if the first user simply views the user-profile page for the second user.

In particular embodiments, social-networking system 160 may calculate a coefficient based on the type of relationship between particular objects. Referencing social graph 200, social-networking system 160 may analyze the number or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights or the ratings of the user's actions with respect to calculating the coefficient for that object. As an example and not by way of limitation, if a user is tagged in a first photo, but merely likes a second photo, social-networking system 160 may determine that the user has a higher coefficient with respect to the first photo than the second photo because having a tagged-in-type relationship with content may be assigned a higher weight or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in social graph 200. As an example and not by way of limitation, social-graph entities that are closer in social graph 200 (i.e. fewer degrees of separation) may have a higher coefficient than entities that are further apart in social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g. via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more objects (e.g. content or other types of objects) of a computing system may be associated with one or more privacy settings. The one or more objects may be stored on or otherwise associated with any suitable computing system or application, such as, for example, a social-networking system 160, a client system 130, a third-party system 170, a social-networking application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g. viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node 204 corresponding to a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by social-networking system 160 or shared with other systems (e.g. a third-party system 170). Although this disclosure describes using particular privacy settings in a particular manner, this disclosure contemplates using any suitable privacy settings in any suitable manner.

In particular embodiments, privacy settings may be based on one or more nodes or edges of a social graph 200. A privacy setting may be specified for one or more edges 206 or edge-types of social graph 200, or with respect to one or more nodes 202, 204 or node-types of social graph 200. The privacy settings applied to a particular edge 206 connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to social-networking system 160. The object may be associated with a concept node 204 connected to a user node 202 of the first user by an edge 206. The first user may specify privacy settings that apply to a particular edge 206 connecting to the concept node 204 of the object, or may specify privacy settings that apply to all edges 206 connecting to the concept node 204. As another example and not by way of limitation, the first user may share a set of objects of a particular object-type (e.g. a set of images). The first user may specify privacy settings with respect to all objects associated with the first user of that particular object-type as having a particular privacy setting (e.g. specifying that all images posted by the first user are visible only to friends of the first user or users tagged in the images).

In particular embodiments, social-networking system 160 may present a "privacy wizard" (e.g. within a web page, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, social-networking system 160 may offer a "dashboard" functionality to the first user that may display, to the first user, current privacy settings of the first user. The dashboard functionality may be displayed to the first user at any appropriate time (e.g. following an input from the first user summoning the dashboard functionality, following the occurrence of a particular event or trigger action). The dashboard functionality may allow the first user to modify one or more of the first user's current privacy settings at any time, in any suitable manner (e.g. redirecting the first user to the privacy wizard).

Privacy settings associated with an object may specify any suitable granularity of permitted access or denial of access. As an example and not by way of limitation, access or denial of access may be specified for particular users (e.g. only me, my roommates, my boss), users within a particular degree-of-separation (e.g. friends, friends-of-friends), user groups (e.g. the gaming club, my family), user networks (e.g. employees of particular employers, students or alumni of particular university), all users ("public"), no users ("private"), users of third-party systems 170, particular applications (e.g. third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and the object may be sent only to the user (or a client system 130 of the user) if the authorization server determines that the user is authorized to access the object based on the privacy settings associated with the object. If the requesting user is not authorized to access the object, the authorization server may prevent the requested object from being retrieved from the data store 164 or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on social-networking system 160, or other computing system. As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users who attend the same university as the first user may view the first user's pictures, but that other users who are family members of the first user may not view those same pictures.

In particular embodiments, social-networking system 160 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g. by opting out, by not opting in) whether social-networking system 160 may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. Social-networking system 160 may access such information in order to provide a particular function or service to the first user, without social-networking system 160 having access to that information for any other purposes. Before accessing, storing, or using such objects or information, social-networking system 160 may prompt the user to provide privacy settings specifying which applications or processes, if any, may access, store, or use the object or information prior to allowing any such action. As an example and not by way of limitation, a first user may transmit a message to a second user via an application related to the online social network (e.g. a messaging app), and may specify privacy settings that such messages should not be stored by social-networking system 160.

In particular embodiments, a user may specify whether particular types of objects or information associated with the first user may be accessed, stored, or used by social-networking system 160. As an example and not by way of limitation, the first user may specify that images sent by the first user through social-networking system 160 may not be stored by social-networking system 160. As another example and not by way of limitation, a first user may specify that messages sent from the first user to a particular second user may not be stored by social-networking system 160. As yet another example and not by way of limitation, a first user may specify that all objects sent via a particular application may be saved by social-networking system 160.

In particular embodiments, privacy settings may allow a first user to specify whether particular objects or information associated with the first user may be accessed from particular client systems 130 or third-party systems 170. The privacy settings may allow the first user to opt in or opt out of having objects or information accessed from a particular device (e.g. the phone book on a user's smart phone), from a particular application (e.g. a messaging app), or from a particular system (e.g. an e-mail server). Social-networking system 160 may provide default privacy settings with respect to each device, system, or application, or the first user may be prompted to specify a particular privacy setting for each context. As an example and not by way of limitation, the first user may utilize a location-services feature of social-networking system 160 to provide recommendations for restaurants or other places in proximity to the user. The first user's default privacy settings may specify that social-networking system 160 may use location information provided from a client device 130 of the first user to provide the location-based services, but that social-networking system 160 may not store the location information of the first user or provide it to any third-party system 170. The first user may then update the privacy settings to allow location information to be used by a third-party image-sharing application to tag photographs or other images with geographic locations.

In particular embodiments, privacy settings may allow a user to specify one or more locations from which objects may be accessed. Access or denial of access to those objects may depend on the location of a user who is attempting to access them. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may become not visible to the second users. As another example and not by way of limitation, a first user may specify that an object is visible only to second users within a threshold distance from the first user. If the first user subsequently moves to a different location, the original second users with access to the object may lose access, while a new group of second users may gain access as they come within the threshold distance of the first user.

In particular embodiments, subject to users' privacy settings or other limitations, social-networking system 160 develops and maintains location histories of users. Social-networking system 160 may store the location history of a user in one or more data stores 164, where it may be associated with a profile of the user or kept as part of a profile of the user or other data object associated with the user. The location history may be compiled from GPS or other location information from one or more mobile devices of the user. Herein, reference to a location of a user or a mobile device encompasses a point of any suitable resolution on the surface of Earth, where appropriate. In addition, it may also encompass elevation or altitude, where appropriate. A point on the surface of Earth may be indicated by a reference to a geographic coordinate system, such as latitude and longitude, the Military Grid Reference System (MGRS), the Universal Transverse Mercator (UTM) system, the Universal Polar Stereographic (UPS) system, or any other suitable geographic coordinate system. Although this disclosure describes particular locations of users or mobile devices and particular ways of indicating them, this disclosure contemplates any suitable locations of users or mobile devices and any suitable ways of indicating them.

A mobile device of a user may communicate its present location or one or more of its past locations along with one or more timestamps to social-networking system 160. The mobile device's location may be used as a proxy for the user's location. This information may be communicated by the mobile device continuously or periodically or, in addition or as an alternative, when the user interacts with social-networking system 160 on the mobile device. For example, the user may open a native software application provided by social-networking system 160 on the mobile device and, through the application, "check in" at a particular place at a particular location at a particular time. As another example, the mobile device may communicate its location to social-networking system 160 every five minutes. This may occur while a native software application provided by social-networking system 160 is open on the mobile device or running (in whole or in part) in the background on the mobile device. Although this disclosure describes particular ways in which a current location or one or more past locations of a user or mobile device may be communicated to social-networking system 160, this disclosure contemplates a current location or one or more past locations of a user or mobile device being communicated to social-networking system 160 in any suitable way.

Privacy settings or other limitations may be applied to the collection and storage of location information of a user. For example, social-networking system 160 may collect or store location information of a user only if the user expressly opts in to having such information collected or stored by social-networking system 160. As another example, social-networking system 160 may stop collecting or storing location information of a user if the user opts out of having such information collected or stored by social-networking system 160. As another example, social-networking system 160 may erase or otherwise limit the use of previously collected or stored location information of a user if the user so requests. Although this disclosure describes particular privacy settings or other limitations that may be applied to the collection and storage of location information of a user, this disclosure contemplates any suitable privacy settings or other limitations that may be applied to the collection and storage of location information of a user.

Social-networking system 160 may analyze a location history of a user to determine movement or location patterns of the user, which social-networking system 160 may use to determine where the user may currently be, where the user may be at a future point in time, or where the user may have been at a past time. Social-networking system 160 may analyze a location history of a user to infer information about a user or determine a particular relevance of a particular location to the user, such as where the user lives, attends school, or works. For example, social-networking system 160 may determine from an analysis of a location history of a user that the user spends most weeknights at a certain location and infer from this (and possibly additional information) that the user lives at that location. As another example, social-networking system 160 may determine from an analysis of a location history of a user that the user spends most weekdays at a certain location and most weekends away from that location and infer from this (and possibly additional information) that the user goes to school or works at that location.

Social-networking system 160 may analyze a location history of a user combined with information in social graph 200 to infer information about the user or determine a particular relevance of a particular location to the user or other users. This may involve identifying one or more locations in the user's location history and identifying information in social graph 200 concerning those locations. For example, social-networking system 160 may determine from an analysis of a location history of a first user that the first user often spends time on the weekends at a first location different from one or more second locations where the user usually spends weekdays and weeknights. Social-networking system 160 may determine from social graph 200 that the first location corresponds to a second user's home address in social graph 200. Social-networking system 160 may also determine from profiles of or other data objects associated with the first and second users in social-networking system 160 that they are approximately the same age. Social-networking system 160 may infer from this (and possibly additional information) that the first and second users are friends with each other and then prompt one or both of the first and second users to form a connection with each other in social-networking system 160.

In addition, social-networking system 160 may determine from a profile of or other data object associated with the second user in social-networking system 160 that the second user attends a particular school. Social-networking system 160 may determine the location of that school from a profile of or other data object associated with the school in social-networking system 160. Social-networking system 160 may determine from an analysis of the location history of the first user that the first user spends most weekdays at the location of the school. Social-networking system 160 may infer from this (and possibly additional information) that the first user also attends that school. Social-networking system 160 may then prompt the first user to update his or her profile to indicate that he or she attends the school or to form a connection with the school or the profile of the school in social-networking system 160. Although this disclosure describes and illustrates particular inferences about a user or location, this disclosure contemplates any suitable inferences about a user or location. For example, U.S. patent application Ser. No. 14/740,034, filed 15 Jun. 2015, which is incorporated herein by reference, discloses other example inferences that may be made about a user or location.

In addition or as an alternative to analyzing a location history of a user combined with information in social graph 200, social-networking system 160 may analyze a location history of a user combined with publicly available or other information from one or more third-party sources outside of social-networking system 160 to infer information about the user or determine a particular relevance of a particular location to the user or other users. In particular embodiments, the third party may be independent, in whole or in part, of an entity that operates social-networking system 160. For example, the following information from one or more of the following third-party sources may be analyzed in combination with a location history of a user:

houses for sale or rent, obtained, e.g., from a multiple listing service (MLS) or ZILLOW;
home values, obtained, e.g., from an MLS or ZILLOW;
crime rates or other statistics, obtained, e.g., from government agencies;
events (such as concerts, movies, and sporting events), obtained from TICKETMASTER, FANDANGO, or other ticketing agencies or from venues;
income maps (which may be correlated with home values), obtained, e.g., from the U.S. Census Bureau or other government agencies;
census data, obtained, e.g., from the U.S. Census Bureau or other government agencies;
voting districts, obtained, e.g., from government agencies;
residential zones, obtained e.g., from government agencies;
agricultural, commercial, or industrial zones, obtained e.g., from government agencies;

tourism areas, obtained e.g., from government agencies or trade associations; or weather, obtained, e.g., from the NATIONAL WEATHER SERVICE or other public or private weather services.

In particular embodiments, information from one or more third-party sources may be supplemented with relevant information in social-networking system 160. For example, event information obtained from ticketing agencies or from venues may be supplemented with information from pages associated with events in social-networking system 160 (as described above). Although this disclosure describes particular information from particular third-party sources, this disclosure contemplates any suitable information from any suitable third-party sources.

When social-networking system 160 infers information about a user or determines a particular relevance of a particular location to the user or other users, social-networking system 160 may assign a label to the user or that location indicating the inference or determination. Herein, reference to a label may encompass text or other data describing or otherwise indicating particular information about a user or concept, where appropriate. In particular embodiments, a label may encompass one or more edges 206 in social graph 200, where appropriate. A label may be assigned to a user or concept by adding the label to or otherwise associating it with a user or concept node 202 or 204 or a user or concept profile or other data object in social-networking system 160 corresponding to the user or concept.

For example, social-networking system 160 may infer that a particular user attends a particular school and create an edge 206 in social graph 200 between a user node 202 corresponding to the user and a concept node 204 corresponding to the school indicating that the user attends the school. In addition or as an alternative, social-networking system 160 may add data to a user profile in social-networking system 160 corresponding to the user that indicates that the user attends the school. In addition or as an alternative, social-networking system 160 may add data to a concept profile in social-networking system 160 corresponding to the school that indicates that the user attends the school. As another example, social-networking system 160 may infer that a particular user works at a particular company or other organization and create an edge 206 in social graph 200 between a user node 202 corresponding to the user and a concept node 204 corresponding to the organization indicating that the user works there. In addition or as an alternative, social-networking system 160 may add data to a user profile in social-networking system 160 corresponding to the user that indicates that the user works at the organization. In addition or as an alternative, social-networking system 160 may add data to a concept profile in social-networking system 160 corresponding to the organization that indicates that the user works there.

As another example, social-networking system 160 may infer, from a comparison of a location history of a user with a map of homes for sale, that the user is shopping for or otherwise interested in buying a home and add data to a user profile in social-networking system 160 corresponding to the user indicating that the user is shopping for a home. In addition or as an alternative, social-networking system 160 may add data to one or more concept profiles in social-networking system 160 corresponding to one or more homes for sale or a neighborhood or area where homes are for sale indicating that the user is or may be shopping for or otherwise interested in those homes or that neighborhood or area. In addition or as an alternative, social-networking system 160 may create one or more edges 206 in social graph 200 between a user node 202 corresponding to the user and one or more concept nodes 204 corresponding to those homes or that neighborhood or area. As another example, social-networking system 160 may infer the home address of a user and create an edge 206 in social graph 200 between a user node 202 corresponding to the user and a concept node 204 corresponding to that address (or a place at that address) indicating that the user lives there. In addition or as an alternative, social-networking system 160 may add data to a user profile in social-networking system 160 corresponding to the user indicating that the user lives at that address. In addition or as an alternative, social-networking system 160 may add data to a concept profile in social-networking system 160 corresponding to that address (or a place at that address) indicating that the user lives there. This label may be used to provide targeted services or advertisements to the user. For example, social-networking system 160 may provide advertisements to the user for popular restaurants in the neighborhood of the user's home address in the evening, when the user may be expected to eat dinner. Although this disclosure describes particular labels indicating particular inferences or determinations, this disclosure contemplates any suitable labels indicating any suitable inferences or determinations.

Figure 3:
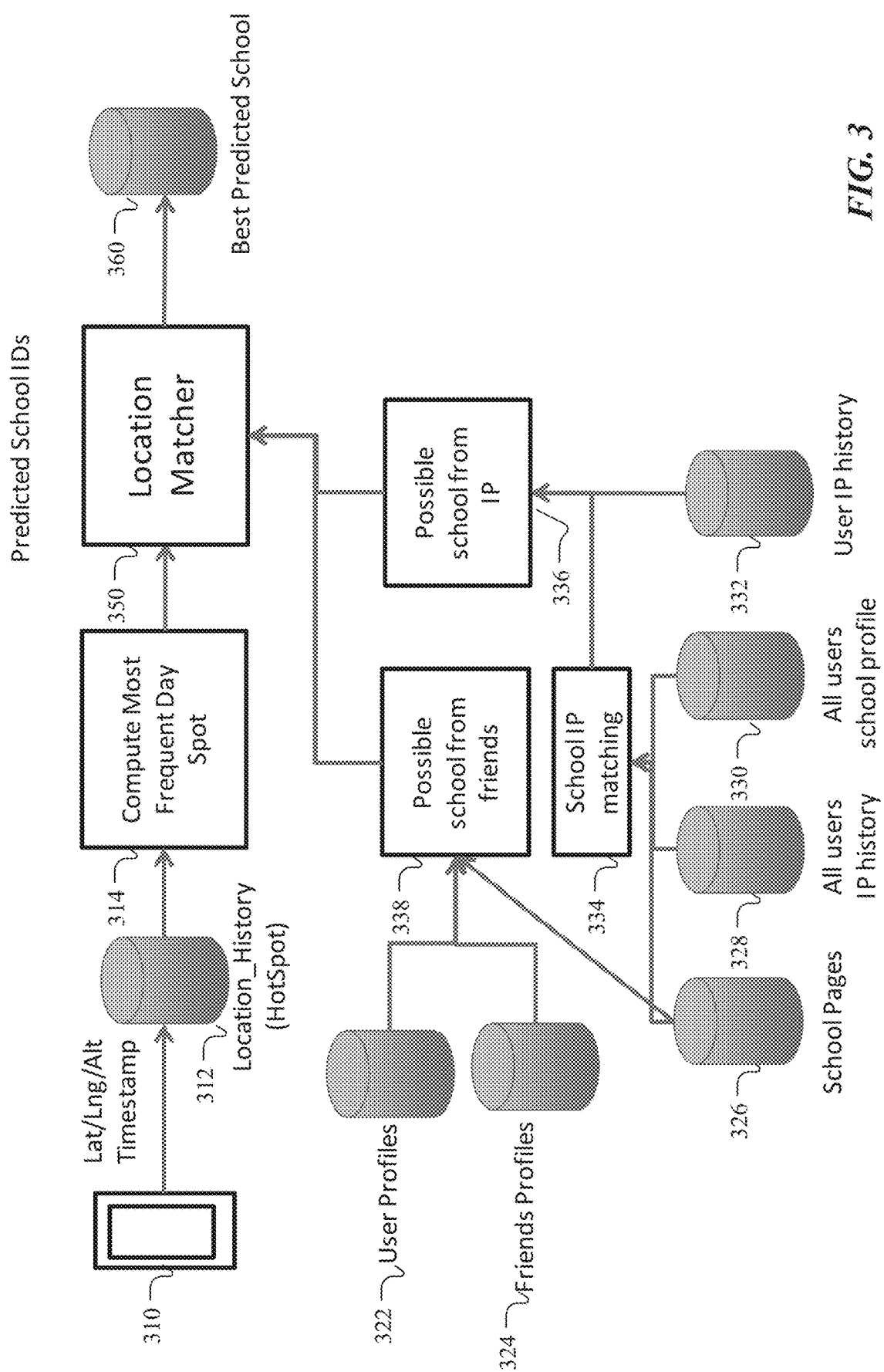
FIG. 3 illustrates an example analysis of a location history of a user combined with data from third-party sources to determine a label to assign to a user or location.

FIG. 3 illustrates an example analysis of a location history of a user combined with data from third-party sources to determine a label to assign to a user or location. In the example of FIG. 3, a school that a user attends is inferred using a location history of the user combined with information in social-networking system 160 and data from third-party sources. Mobile device 310 may send geopositioning coordinates to social-networking system 160, which may store them in the user's location history database 312, as described above. Based on the location history, social-networking system 160 may compute a most frequent weekday location for the user, as shown at element 314. Additionally, social-networking system 160 may gather information from the user's profile 322 and profiles of the user's friends 324 to determine schools that are associated in common with friends and the user, as shown at element 338. Social-networking system 160 may also look at IP histories of other users 328, as well as the IP addresses of schools pages 326, to determine potential IP addresses associated with particular schools, as shown at element 334. This school-IP-address information may then be compared with the user's IP history 332 to determine possible schools, as shown at element 336. Locations (such as street addresses) associated with the identified schools are determined from websites of the schools or other publicly available information about the schools. If the user's most frequent daytime location corresponds to a location of a school associated with friends or a school associated with the user's IP history, social-networking system 160 may infer the user's school, as shown in elements 350 and 360.

Figure 4:
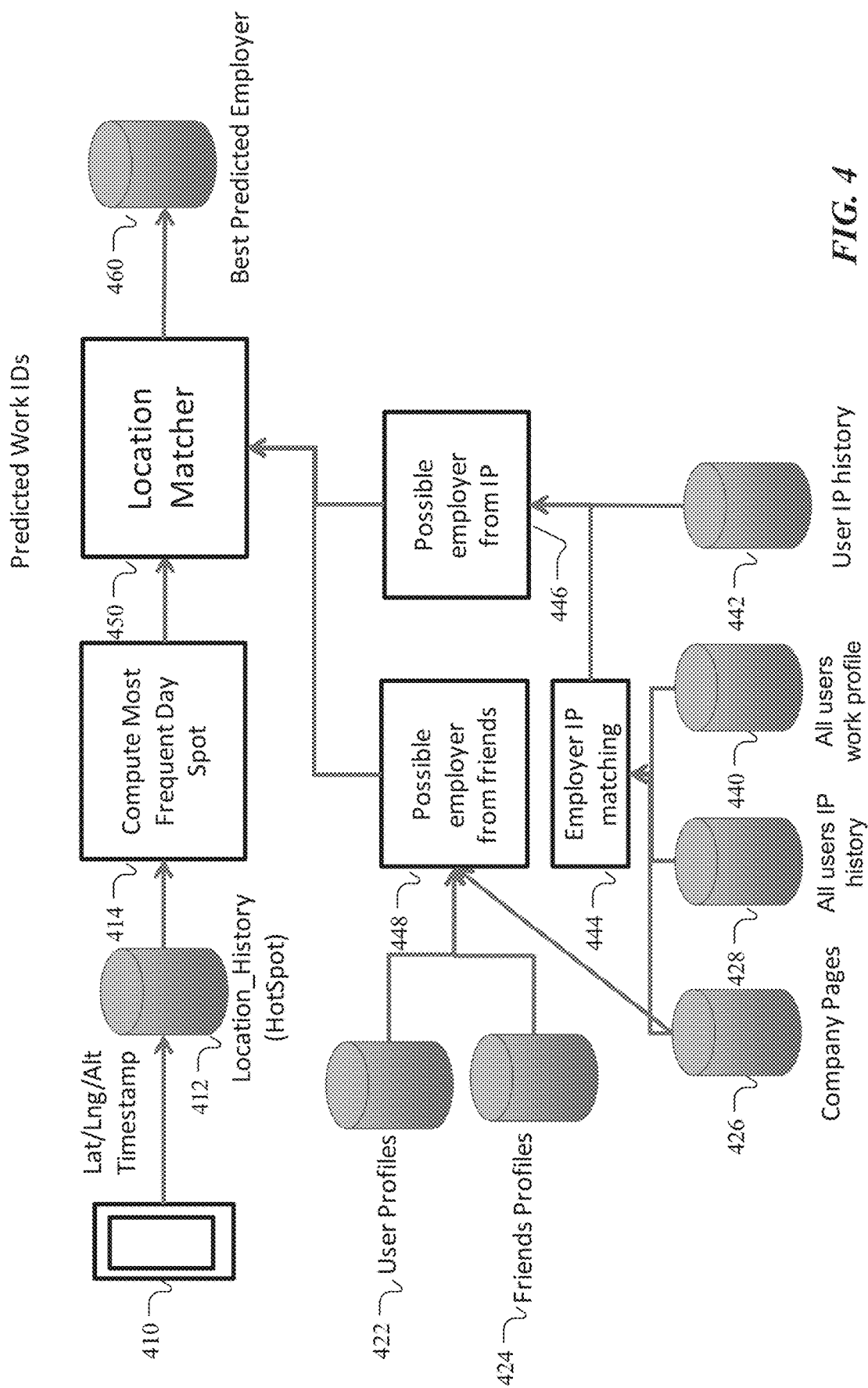
FIG. 4 illustrates another example analysis of a location history of a user combined with data from third-party sources to determine a label to assign to a user or location.

FIG. 4 illustrates another example analysis of a location history of a user combined with data from third-party sources to determine a label to assign to a user or location. In the example of FIG. 4, a user's place of work is inferred using a location history of the user combined with information in social-networking system 160 and data from third-party sources. Mobile device 410 may send geopositioning coordinates to social-networking system 160, which may store them in the user's location history database 412, as described above. Based on the location history, social-networking system 160 may compute a most frequent weekday location for the user, as shown at element 414. Additionally, social-networking system 160 may gather information from the user's profile 422 and profiles of the user's friends 424 to determine businesses that are associated in common with friends and the user, as shown at element 448. Social-networking system 160 may also look at IP histories of other users 428, as well as the IP addresses of company pages 426 and work profiles of other users 440, to determine potential IP addresses associated with particular employers, as shown at element 444. This company-IP-address information may then be compared with the user's IP history 442 to determine possible businesses, as shown at element 446. Locations (such as street addresses) associated with the identified businesses are determined from websites of the businesses or other publicly available information about the businesses. If the user's most user's most frequent daytime location corresponds to a location of an employer associated with friends or an employer associated with the user's IP history, social-networking system 160 may infer the user's place of work, as shown in elements 450 and 460.

In particular embodiments, social-networking system 160 may receive additional geopositioning information from one or more mobile devices associated with the user and build on prior inferences to arrive at other inferences. Social-networking system 160 may analyze newly received geopositioning information of the user in light of previously determined inferences to determine new events or behaviors of the user. As an example and not by way of limitation, social-networking system 160 may determine whether a user is in the home-buying market. In this example, social-networking system 160 may compare new geopositioning data with prior inferences regarding the user's home location and the home location of the user's friends. Based on the comparison, social-networking system 160 may detect that the user was not at home or visiting friends. Social-networking system 160 may then compare the new locations with third-party data related to homes for sale and determine that the user was visiting various addresses that are listed for sale. Social-networking system 160 may then infer that the user is in the home-buying market and assign a label to the user (as described above) indicating that the user is in the home-buying market. With this information, social-networking system 160 may provide the user services or advertisements targeted to people in the home-buying market. The targeted marketing may also be tailored based on other inferences or social-networking data. As an example and not by way of limitation, the user may be served advertisements for homes that are within an inferred price range that the user can afford based on the user's job title and user's spouse's work position. Although this disclosure describes building particular inferences on particular prior inferences and particular third-party data in particular ways, this disclosure contemplates building any suitable inferences on any suitable prior inferences and any suitable third-party data in any suitable manner.

Social-networking system 160 may make inferences related to any suitable behavior or market. As an example and not by way of limitation, social-networking system 160 may make inferences that users are traveling, moving, voting, or have a net worth within a particular range. Social-networking system 160 may also rely on data sets related to any suitable geopositioning data, such as, as an example and not by way of limitation, location of events, home location data, company location data, zoning data, and demographic data, as described above. Additionally, social-networking system 160 may further rely on third-party data sets, such as, as an example and not by way of limitation, housing market data, crime data, income map data, voting district data, or census data, as described above. Although this disclosure describes building particular inferences using particular data sets, this disclosure contemplates building any suitable inferences using any suitable data sets.

In particular embodiments, subject to privacy settings or other limitations (as described above), social-networking system 160 may provide inference data to enterprise users for marketing purposes. Inference data may be made available for querying through an application programming interface (API). As an example and not by way of limitation, an API may provide functionality for a customer to query in real-time whether a user is currently in the market for buying a home. As another example and not by way of limitation, an API may allow customers to obtain a list of all users that are in the home-buying market in an area (e.g. zip code or city). Although this disclosure describes making particular inference data available in particular ways, this disclosure contemplates making any suitable inference data available in any suitable manner.

Figure 5:
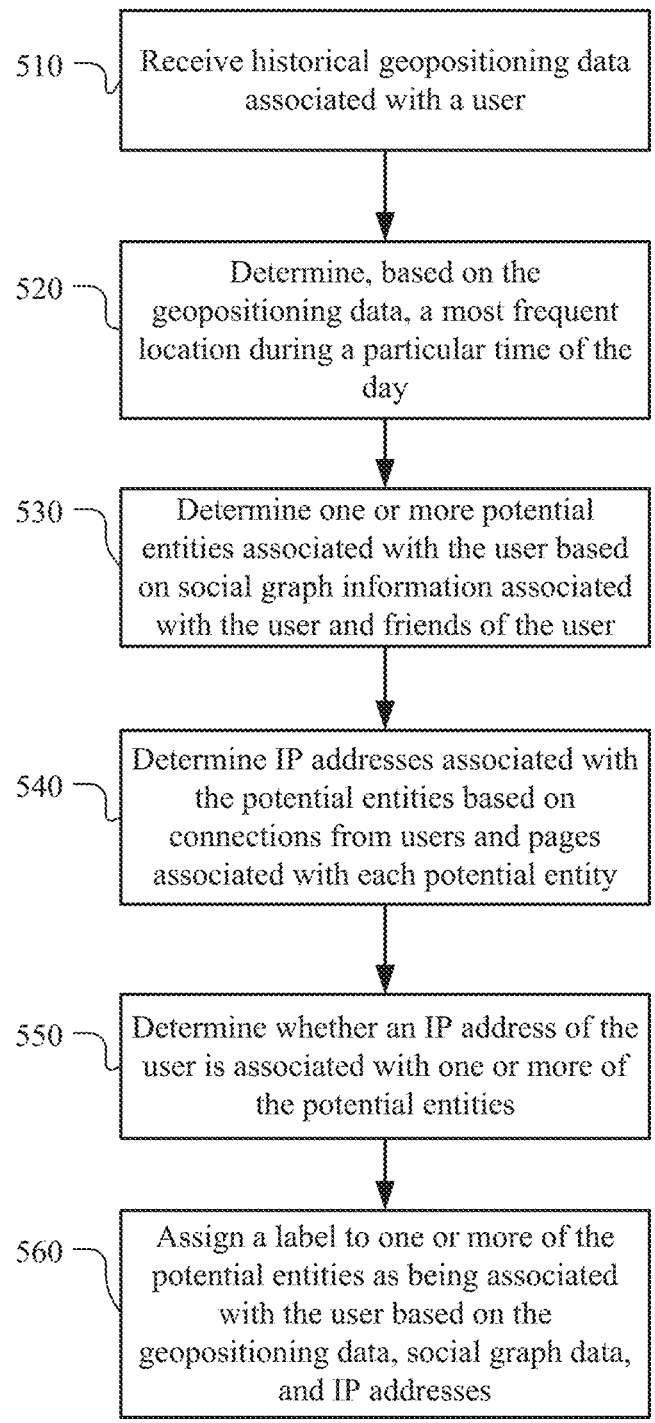
FIG. 5 illustrates an example method for analyzing a location history of a user combined with data from third-party sources to determine a label to assign to a user or location.

FIG. 5 illustrates an example method 500 for analyzing a location history of a user combined with data from third-party sources to determine a label to assign to a user or location. The method may begin at step 510, where social-networking system 160 may receive historical geopositioning data associated with a user. At step 520, social-networking system 160 may determine, based on the geopositioning data, a most frequent location during a particular time of the day. At step 530, social-networking system 160 may determine one or more potential entities associated with the user based on social graph information associated with the user and friends of the user. At step 540, social-networking system 160 may determine IP addresses associated with the potential entities based on connections from users and pages associated with each potential entity. At step 550, social-networking system 160 may determine whether an IP address of the user is associated with one or more of the potential entities. At step 560, social-networking system 160 may assign a label to one or more of the potential entities as being associated with the user based on the geopositioning data, social-networking data, and IP addresses. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for generating user inferences based on geopositioning and social-networking data including the particular steps of the method of FIG. 5, this disclosure contemplates any suitable method for generating user inferences based on geopositioning and social-networking data including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
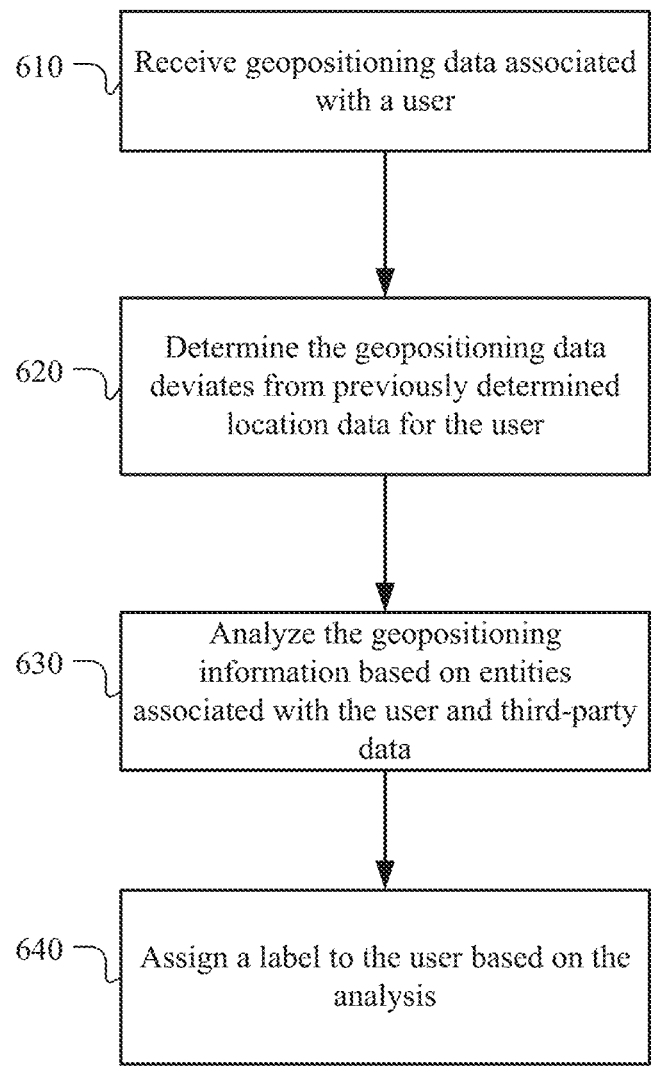
FIG. 6 illustrates another example method for analyzing a location history of a user combined with data from third-party sources to determine a label to assign to a user or location.

FIG. 6 illustrates another example method 600 for analyzing a location history of a user combined with data from third-party sources to determine a label to assign to a user or location. The method may begin at step 610, where social-networking system 160 may receive geopositioning data associated with a user. At step 620, social-networking system 160 may determine the geopositioning data deviates from previously determined location data for the user. At step 630, social-networking system 160 may analyze the geopositioning information based on entities associated with the user and third-party data. At step 640, social-networking system 160 may assign a label to the user based on the analysis. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for generating user inferences based on geopositioning and third-party data including the particular steps of the method of FIG. 6, this disclosure contemplates any suitable method for generating user inferences based on geopositioning and third-party data including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
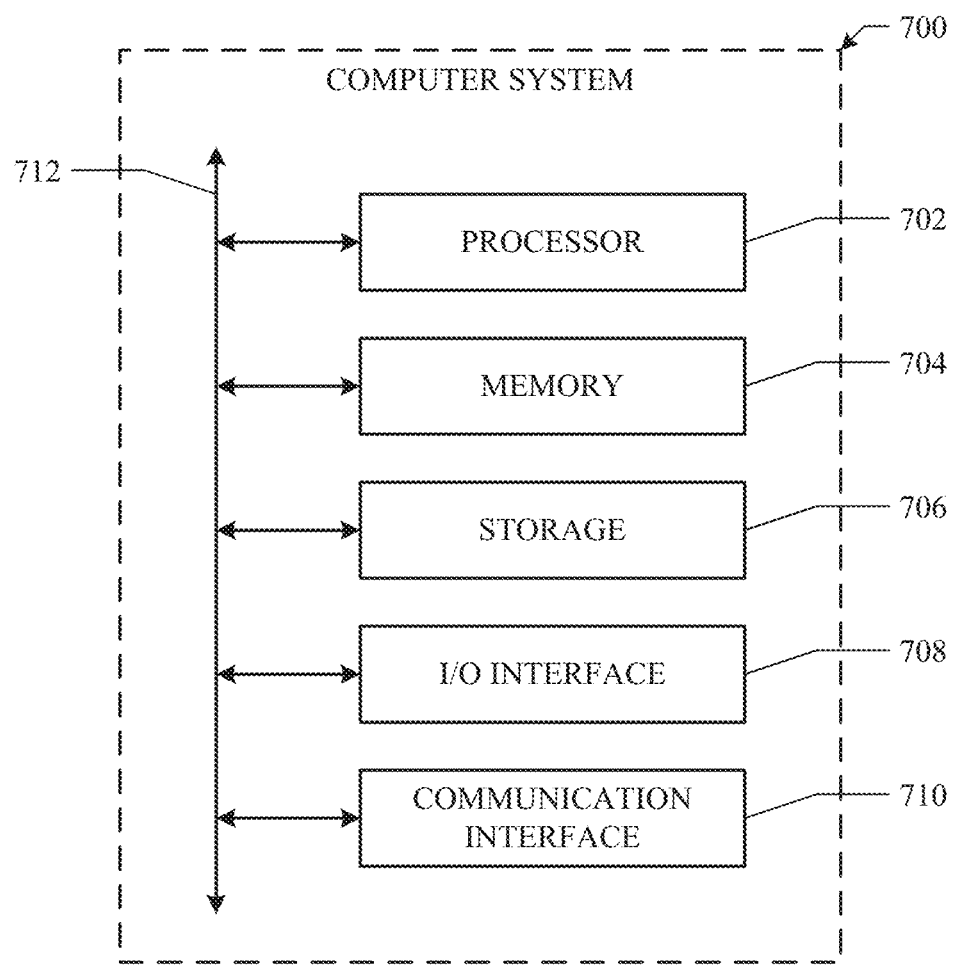
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method comprising:
by one or more computing devices, accessing a location history of a user of a social-networking system comprising geopositioning data previously captured from a mobile computing device of the user, wherein:
the social-networking system comprises a social graph that comprises a plurality of nodes and edges connecting the nodes; and
at least one node corresponds to the user;
by the one or more computing devices, accessing a data set from a third-party source operating outside of the social-networking system, wherein the data set from the third-party source comprises activities of the user of the social-networking system with respect to one or more locations on the third-party source and information regarding the one or more locations, and wherein the user of the social-networking system interfaces with the third-party source via an application programming interface;
by the one or more computing devices, comparing (1) the geopositioning data previously captured from the mobile computing device of the user and (2) the activities of the user with respect to the one or more locations on the third-party source to determine an overlap location between the location history of the user and the locations associated with the data set from the third-party source;
by the one or more computing devices, determining a relevance of the overlap location to the user based on the comparison and information regarding the overlap location from the third-party source;
by the one or more computing devices, updating the social graph of the social-networking system to add an edge between the node corresponding to the user of the mobile computing device and a node corresponding to the overlap location; and
by the one or more computing devices, sending to the user one or more content objects that are identified based on the information regarding the overlap location.

2. The method of claim 1, wherein:
at least one node corresponds to each of a plurality of other users;
the method further comprises, by the one or more computing devices, accessing within the social-networking system location information associated with one or more of the other users;
the location history of the user is compared with at least some of the location information associated with the one or more of the other users, in addition to the one or more locations referenced by the data set from the third-party source, to determine an overlap location between the location history of the user and the location information associated with the one or more of the other users; and
one or more additional edges are added to the social graph based on the comparison between the location history and the location information.

3. The method of claim 1, wherein:
at least one node corresponds to each of a plurality of places;
the method further comprises, by the one or more computing devices, accessing within the social-networking system location information associated with one or more of the places;
the location history of the user is compared with at least some of the location information associated with the one or more of the places, in addition to the locations in the data set from the third-party source, to determine an overlap location between the location history of the user and the location information associated with the one or more of the places; and
one or more additional edges are added to the social graph based on the comparison between the location history and the location information.

4. The method of claim 1, wherein the information regarding the one or more locations in the data set describes the locations.

5. The method of claim 1, wherein the information regarding the one or more locations in the data set indicates a classification of the locations.

6. The method of claim 1, wherein the edge connecting the node corresponding to the user to the node corresponding to the overlap location associates the overlap location with respect to the user.

7. The method of claim 1, wherein the edge connecting the node corresponding to the user to the node corresponding to the overlap location describes an activity of the user inferred from the comparison.

8. The method of claim 1, wherein the edge connecting the node corresponding to the user to the node corresponding to the overlap location indicates a classification of the user inferred from the comparison.

9. The method of claim 1, wherein the data set from the third-party source is publicly available.

10. The method of claim 1, wherein the data set from the third-party source comprises one or more of the following:
a listing of real estate for sale;
crime statistics;
a listing of events;
an income map;
a listing of residential addresses;
a listing of business addresses;
census data;
voting data;
zoning data;
tourism data;

demographic data;
migration data;
weather data; or
restaurant data.

11. A system comprising:
one or more processors; and
one or more computer-readable non-transitory storage media coupled to one or more of the processors and comprising instructions operable when executed by one or more of the processors to cause the system to:
  access a location history of a user of a social-networking system comprising geopositioning data previously captured from a mobile computing device of the user, wherein:
    the social-networking system comprises a social graph that comprises a plurality of nodes and edges connecting the nodes; and
    at least one node corresponds to the user;
  access a data set from a third-party source operating outside of the social-networking system, wherein the data set from the third-party source comprises activities of the user of the social-networking system with respect to one or more locations on the third-party source and information regarding the one or more of the locations, and wherein the user of the social-networking system interfaces with the third-party source via an application programming interface;
  compare (1) the geopositioning data previously captured from the mobile computing device of the user and (2) the activities of the user with respect to the one or more locations on the third-party source to determine an overlap location between the location history of the user and the locations associated with the data set from the third-party source;
  determine a relevance of the overlap location to the user based on the comparison and information regarding the overlap location from the third-party source;
  update the social graph of the social-networking system to add an edge between the node corresponding to the user of the mobile computing device and a node corresponding to the overlap location; and
  send to the user one or more content objects that are identified based on the information regarding the overlap location.

12. The system of claim 11, wherein:
at least one node corresponds to each of a plurality of other users;
the instructions are further operable when executed by one or more of the processors to cause the system to access within the social-networking system location information associated with one or more of the other users;
the location history of the user is compared with at least some of the location information associated with the one or more of the other users, in addition to the one or more locations referenced by the data set from the third-party source, to determine an overlap location between the location history of the user and the location information associated with the one or more of the other users; and
one or more additional edges are added to the social graph based on the comparison between the location history and the location information.

13. The system of claim 11, wherein:
at least one node corresponds to each of a plurality of places;
the instructions are further operable when executed by one or more of the processors to cause the system to access within the social-networking system location information associated with one or more of the places;
the location history of the user is compared with at least some of the location information associated with the one or more of the places, in addition to the locations in the data set from the third-party source, to determine an overlap between the location history of the user and the location information associated with the one or more of the places; and
one or more additional edges are added to the social graph based on the comparison between the location history and the location information.

14. The system of claim 11, wherein the information regarding the one or more locations in the data set describes the locations.

15. The system of claim 11, wherein the information regarding the one or more locations in the data set indicates a classification of the locations.

16. The system of claim 11, wherein the edge connecting the node corresponding to the user to the node corresponding to the overlap location associates the overlap location with respect to the user.

17. The system of claim 11, wherein the edge connecting the node corresponding to the user to the node corresponding to the overlap location describes an activity of the user inferred from the comparison.

18. The system of claim 11, wherein the edge connecting the node corresponding to the user to the node corresponding to the overlap location indicates a classification of the user inferred from the comparison.

19. The system of claim 11, wherein the data set from the third-party source is publicly available.

20. The system of claim 11, wherein the data set from the third-party source comprises one or more of the following:
a listing of real estate for sale;
crime statistics;
a listing of events;
an income map;
a listing of residential addresses;
a listing of business addresses;
census data;
voting data;
zoning data;
tourism data;
demographic data;
migration data;
weather data; or
restaurant data.

21. A system comprising:
means for accessing a location history of a user of a social-networking system comprising geopositioning data previously captured from a mobile computing device of the user, wherein:
  the social-networking system comprises a social graph that comprises a plurality of nodes and edges connecting the nodes; and
  at least one node corresponds to the user;
means for accessing a data set from a third-party source operating outside of the social-networking system, wherein the data set from the third-party source comprises activities of the user of the social-networking system with respect to one or more locations on the third-party source and information regarding the one or more locations, and wherein the user of the social-networking system interfaces with the third-party source via an application programming interface;

means for comparing (1) the geopositioning data previously captured from the mobile computing device of the user and (2) the activities of the user with respect to the one or more locations on the third-party source to determine an overlap location between the location history of the user and the locations associated with the data set from the third-party source;

means for determining a relevance of the overlap location to the user based on the comparison and information regarding the overlap location from the third-party source;

means for updating the social graph of the social-networking system to add an edge between the node corresponding to the user of the mobile computing device and a node corresponding to the overlap location; and means for sending to the user one or more content objects that are identified based on the information regarding the overlap location.

\* \* \* \* \*